(12) United States Patent
Miyoshi et al.

(10) Patent No.: US 10,427,707 B2
(45) Date of Patent: Oct. 1, 2019

(54) DUAL-PINION ELECTRIC POWER STEERING DEVICE

(71) Applicant: HONDA MOTOR CO., LTD., Tokyo (JP)

(72) Inventors: Takashi Miyoshi, Wako (JP); Yosuke Tanaka, Wako (JP); Yuichi Shimada, Wako (JP); Tsutomu Tatsuishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 21 days.

(21) Appl. No.: 15/743,558

(22) PCT Filed: Jul. 5, 2016

(86) PCT No.: PCT/JP2016/069867
§ 371 (c)(1),
(2) Date: Jan. 10, 2018

(87) PCT Pub. No.: WO2017/010345
PCT Pub. Date: Jan. 19, 2017

(65) Prior Publication Data
US 2018/0201304 A1    Jul. 19, 2018

(30) Foreign Application Priority Data

Jul. 16, 2015 (JP) ................................. 2015-141754

(51) Int. Cl.
*B62D 3/12* (2006.01)
*B62D 5/04* (2006.01)
*F16H 55/28* (2006.01)

(52) U.S. Cl.
CPC ............. *B62D 5/0424* (2013.01); *B62D 3/12* (2013.01); *B62D 3/123* (2013.01); *B62D 5/0403* (2013.01); *B62D 5/0454* (2013.01); *B62D 5/0463* (2013.01)

(58) Field of Classification Search
CPC .. B62D 5/0424; B62D 5/0403; B62D 5/0454; B62D 3/12; B62D 3/123; F16H 55/283; F16H 55/286; F16H 55/288
(Continued)

(56) References Cited

U.S. PATENT DOCUMENTS 4,271,716 A * 6/1981 Carduner ............... B62D 3/123
74/422
5,845,532 A * 12/1998 Phillips ................. B62D 3/123
74/422
(Continued)

FOREIGN PATENT DOCUMENTS

| JP | 2013-063723 A | 4/2013 |
| JP | 2013-233858 A | 11/2013 |
| JP | 2014-177212 A | 9/2014 |
| JP | 2014-184769 A | 10/2014 |

OTHER PUBLICATIONS

International Search Report dated Sep. 13, 2016, Application No. PCT/JP2016/069867 (2 pages).
(Continued)

*Primary Examiner* — Anne Marie M Boehler
(74) *Attorney, Agent, or Firm* — Rankin, Hill & Clark LLP

(57) ABSTRACT

A dual-pinion electric power steering device has: a rack shaft that causes a turnable member to turn; a first pinion shaft to which a steering force from a steering wheel is transmitted; a first rack teeth disposed on the rack shaft and capable of meshing with the first pinion shaft; a second pinion shaft to which a rotational driving force from an assist
(Continued)

motor is transmitted; a second rack teeth disposed on the rack shaft and capable of meshing with the second pinion shaft; a first pressing member disposed across the rack shaft from the first pinion shaft and configured to press the rack shaft toward the first pinion shaft; and a second pressing member disposed across the rack shaft from the second pinion shaft and configured to press the rack shaft toward the second pinion shaft. The first pressing member has a lower rigidity than the second pressing member.

4 Claims, 5 Drawing Sheets

(58) Field of Classification Search
USPC .................................. 180/444; 74/411, 422
See application file for complete search history.

(56) References Cited

U.S. PATENT DOCUMENTS

| 2006/0042849 | A1* | 3/2006 | Yamamoto | B22D 17/00 |
| | | | | 180/233 |
| 2014/0090495 | A1* | 4/2014 | Witting | B62D 3/123 |
| | | | | 74/89 |
| 2014/0109702 | A1* | 4/2014 | Kometani | B62D 3/123 |
| | | | | 74/30 |
| 2014/0209407 | A1 | 7/2014 | Di Giusto et al. | |
| 2016/0223066 | A1* | 8/2016 | Imamura | F16H 55/283 |
| 2018/0094715 | A1* | 4/2018 | Vizier | B62D 3/123 |

OTHER PUBLICATIONS

Written Opinion of the International Searching Authority dated Sep. 13, 2016, Application No. PCT/JP2016/069867 (3 pages).

* cited by examiner

DUAL-PINION ELECTRIC POWER STEERING DEVICE

TECHNICAL FIELD

The present invention relates to a dual-pinion electric power steering device having two pinion shafts.

BACKGROUND ART

As described in patent document 1 for example, a dual-pinion electric power steering device having two pinion shafts is known. In this dual-pinion electric power steering device, one of the two pinion shafts is connected to a steering shaft and the other one of the dual pinion shafts is connected to a motor that increases (assists) a steering force.

A rack shaft moves left or right in a vehicle width direction by a mesh operation with the two pinion shafts. A reaction force acts on the rack shaft by the two pinion shafts such that the rack shaft and the pinion shafts separate from each other. For this reason, for each of the two pinion shafts, it is necessary to press a back surface of the rack shaft by a rack guide.

PRIOR ART DOCUMENT

Patent Document

Patent document 1: Japanese Unexamined Patent Application Publication No. 2014-184769

SUMMARY OF INVENTION

Problem to be Solved by the Invention

A rack shaft has a periphery surface on which two racks (two sets of rack teeth) are disposed to respectively mesh with a pinion of the pinion shaft on the steering shaft side and a pinion of the pinion shaft on the motor side. In such a structure, it is difficult to dispose the two sets of rack teeth on the periphery surface with high accuracy so that the two sets of rack teeth are in proper phase relation with respective pinions, which may cause slight misalignment between the two sets of rack teeth and the pinions.

Specifically, because a large load is applied to the rack and pinion on the motor side, the rack teeth and the pinion gear of the rack and pinion on the motor side are likely to follow each other. In this situation, the rack shaft is slightly rotated in a radial direction thereof so that the rack shaft adapts itself to the meshing of the rack and pinion on the motor side. As a result, misalignment occurs between the rack teeth and the pinion of the rack and pinion on the steering shaft side of the same rack shaft, which may impair the feeling of smoothness in operating the steering wheel.

A general object of the present invention is to provide a dual-pinion electric power steering device capable of maintaining the feeling of smoothness in steering.

Solution to Problem

To achieve the aforementioned object, the present invention provides a dual-pinion electric power steering device including: a rack shaft that causes a turnable member to turn; a first pinion shaft to which a steering force from a steering wheel is transmitted; a first rack teeth disposed on the rack shaft and capable of meshing with the first pinion shaft; a second pinion shaft to which a rotational driving force from a rotational driving source is transmitted; a second rack teeth disposed on the rack shaft and capable of meshing with the second pinion shaft; a first pressing member disposed across the rack shaft from the first pinion shaft such that the rack shaft is interposed between the first pressing member and the first pinion shaft, the first pressing member configured to press the rack shaft against the first pinion shaft; and a second pressing member disposed across the rack shaft from the second pinion shaft such that the rack shaft is interposed between the second pressing member and the second pinion shaft, the second pressing member configured to press the rack shaft against the second pinion shaft. The first pressing member has a lower rigidity than the second pressing member.

When a rotational driving force is transmitted from the rotational driving source to apply a large load to the second pinion shaft, the rack and pinion on the rotational driving source side align with each other. In this situation, misalignment occurs in the rack and pinion on the steering wheel side. In the present invention, the first pressing member on the steering wheel side is formed to have a lower rigidity than the second pressing member on the rotational driving source side, so that the misalignment occurring in the rack and pinion on the steering wheel side can be absorbed. As a result, the present invention may avoid the misalignment occurring between the rack teeth and the pinion of the rack and pinion on the steering wheel side and maintain the feeling of smoothness in steering. Here, "rigidity" means the material property of an object to be less likely to deform against an external force (Young's modulus or stiffness modulus).

An aspect of the present invention is that the first pressing member may be made of a material having a lower rigidity than the second pressing member, and the first pressing member is made of aluminum or an aluminum alloy.

Due to this feature, because the first pressing member on the steering wheel side is made of aluminum or an aluminum alloy, the misalignment occurring between the rack and pinion on the steering wheel side may be preferably absorbed. In addition, the second pressing member on the rotational driving source side may be made of a material having a higher rigidity than aluminum or aluminum alloy, such as iron. This increases the degree of freedom in material selection.

Another aspect of the present invention is that the second pressing member may be made of an iron material.

Due to this feature, because the second pressing member on the rotational driving source side is made of an iron material, a material having a lower rigidity than the second pressing member (e.g., a metal material or resin material having a lower rigidity than iron) may be used for the first pressing member having a lower rigidity than the second pressing member. With this selection of materials, the manufacturing cost can be lowered.

Another aspect of the present invention is that each of the first pressing member and the second pressing member may include a bifurcated portions having therebetween a curved surface portion having an arc-shaped cross section, and the first pressing member and the second pressing member are formed such that the bifurcated portion of the first pressing member has a smaller outside diameter dimension (D1) than an outside diameter dimension (D2) of the bifurcated portion of the second pressing member (i.e., D1<D2).

Due to this feature, because the bifurcated portions of the first pressing member have a smaller outside diameter dimension (D1) than an outside diameter dimension (D2) of the bifurcated portions of the second pressing member (i.e., D1<D2), the bifurcated portions of the first pressing member are formed to have a thickness smaller than that of the bifurcated portions of the second pressing member. As a result, the first pressing member is formed to have a lower rigidity than the second pressing member.

Effects of Invention

The present invention provides a dual-pinion electric power steering device capable of maintaining the feeling of smoothness in steering.

Figure 5A:
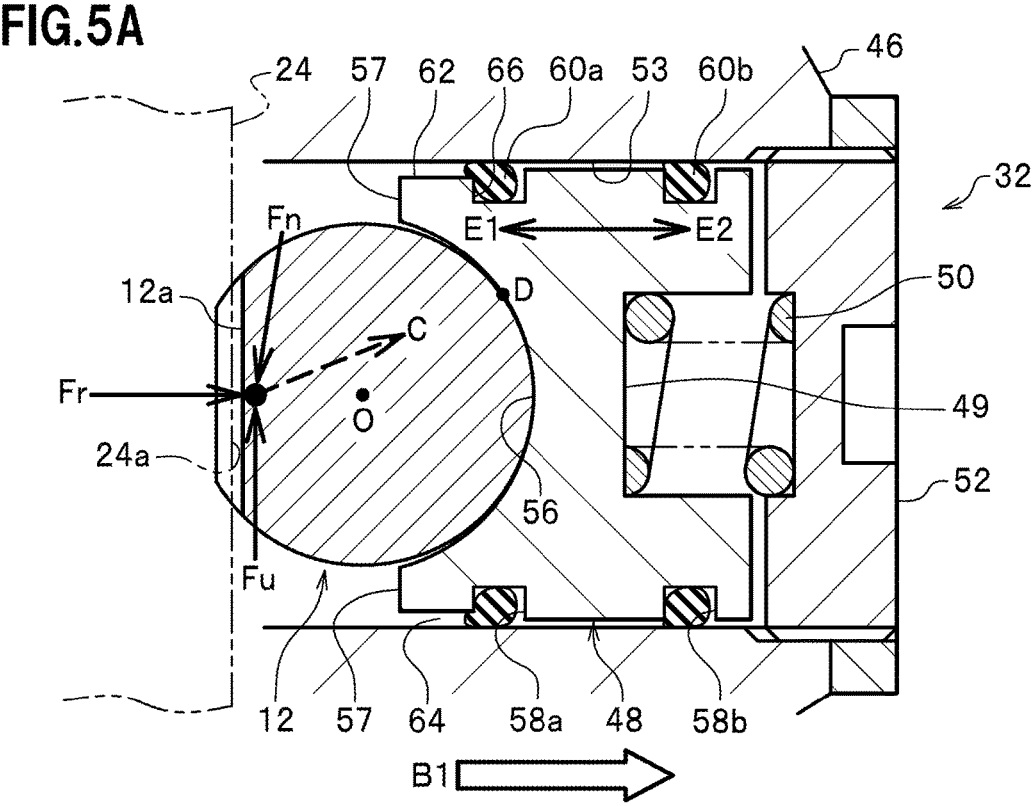
Figure 5B:
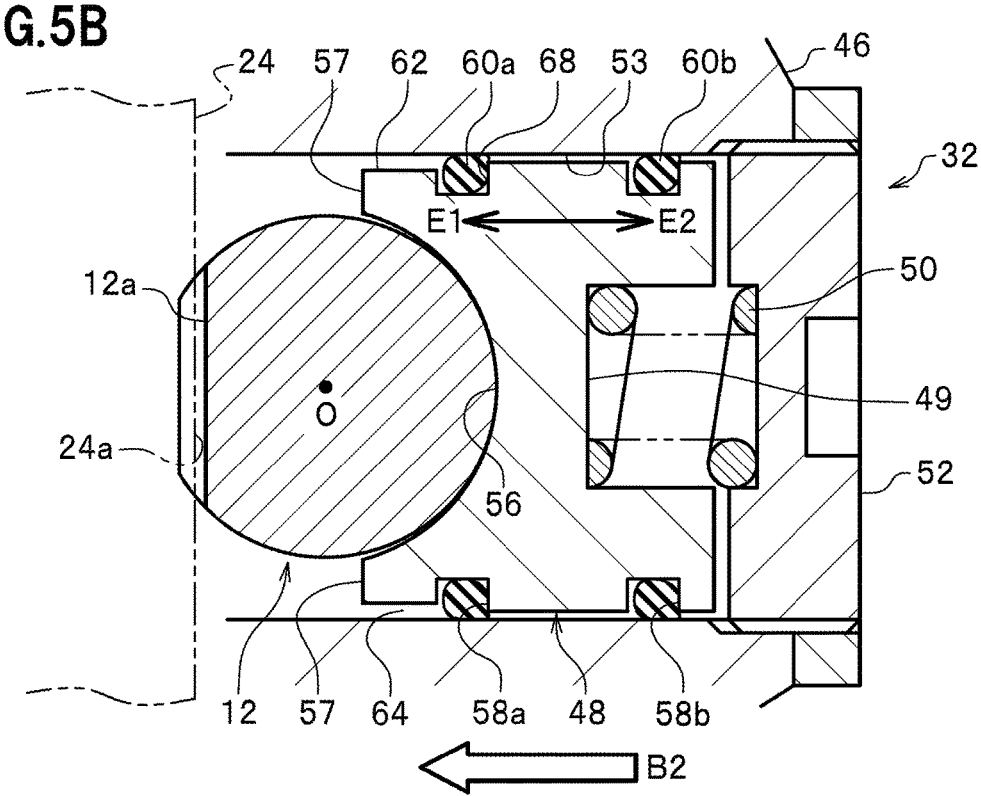

The FIGS. 5A and 5B are each an explanatory view illustrating a meshing state between the rack shaft and a pinion shaft.

Figure 6A:
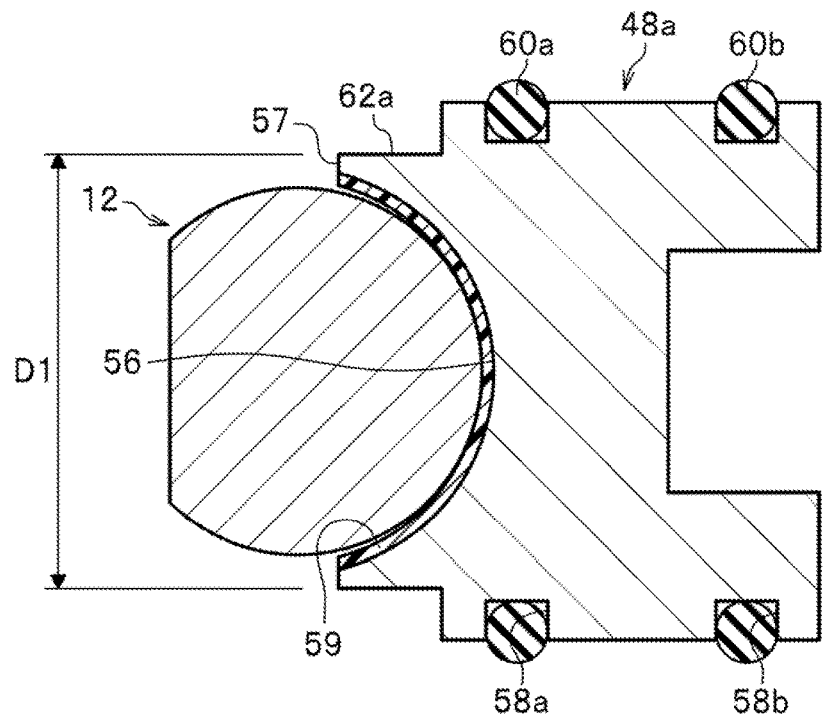
Figure 6B:
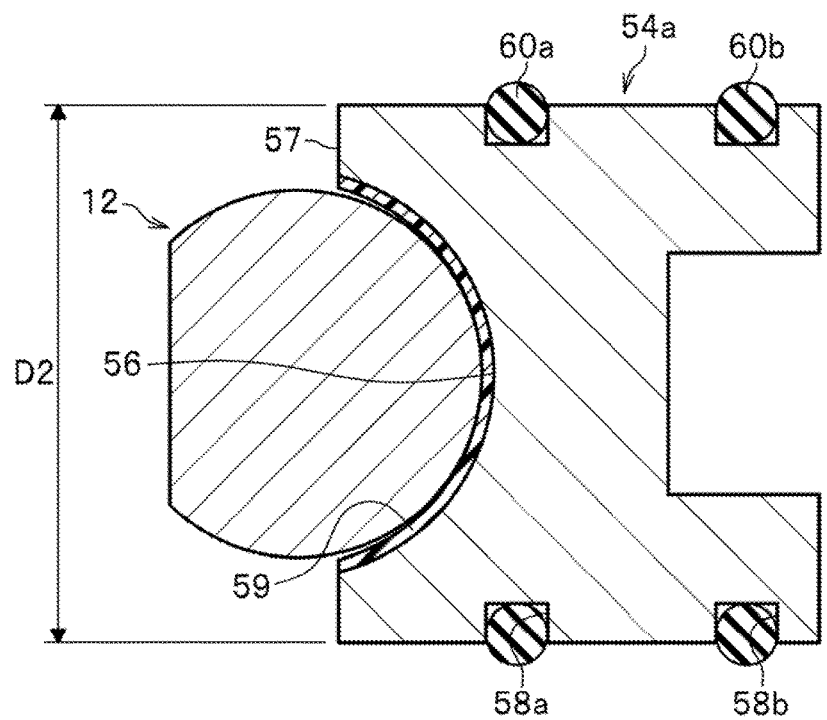

FIG. 6A is a configuration diagram of a first rack guide member according to a variant embodiment; FIG. 6B is a configuration diagram of a second rack guide member according to the variant embodiment.

EMBODIMENTS FOR CARRYING OUT THE INVENTION

In the following, an embodiment according to the present invention is described in detail referring to the drawings as appropriate. Note that, in each of figures, "front-rear" represents a vehicle front-rear direction; "right-left" represents a vehicle width direction (right-left direction); "up-down" represents a vertical up-down direction.

Figure 1:
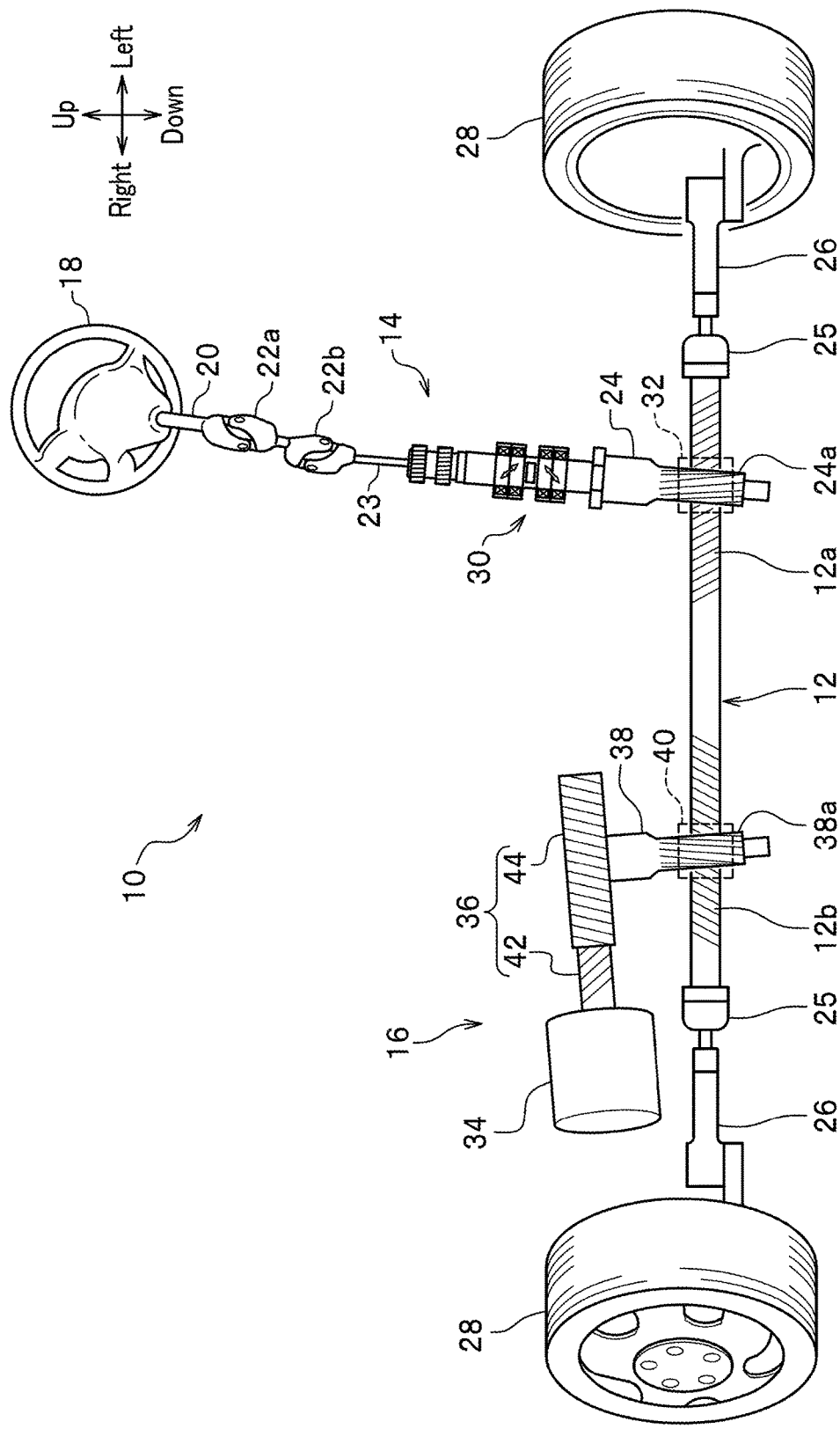
FIG. 1 is a schematic diagram of a dual-pinion electric power steering device according to an embodiment of the present invention.

As shown in FIG. 1, a dual-pinion electric power steering device 10 (hereinafter simply referred to as electric power steering device 10) is configured to have a steering mechanism 14 having a rack shaft (rack bar) 12 extending in the right-left direction and a torque assist mechanism 16 disposed on one end side of the rack shaft 12.

The steering mechanism 14 includes: a steering wheel 18 that is operated by a driver; a steering shaft 20 that rotates in a rotational direction according to the steering operation made to the steering wheel 18; and a pinion shaft (first pinion shaft) 24. The pinion shaft 24 is disposed below the steering shaft 20 via a pair of universal joints 22a, 22b and an intermediate shaft 23. A steering force is transmitted from the steering wheel 18 to the pinion shaft 24. Note that the steering mechanism 14 shown in FIG. 1 is for a left-hand-drive vehicle. However, a structure similar to the above-described structure is used for a right-hand-drive vehicle.

The steering mechanism 14 further includes: a rack shaft 12 having a rack (first rack teeth) 12a formed thereon with which a pinion 24a of the pinion shaft 24 meshes; left and right wheels 28, 28 linked via universal joints 25 and tie rods 26 to axial opposite ends of the rack shaft 12; a torque sensor 30 that detects a torque applied to the steering shaft 20; a guide mechanism 32 that presses the rack shaft 12 against the pinion shaft 24. When a driver operates the steering wheel 18, a resultant steering force is transmitted to the rack shaft 12, which causes the rack shaft 12 to move left or right along the vehicle width direction to turn the left and right wheels (turnable members) 28, 28.

The torque assist mechanism 16 includes: the rack shaft 12; an assist motor (rotational driving source) 34; a worm gear mechanism 36; a pinion shaft 38 (second pinion shaft) having a pinion 38a disposed thereon that meshes with a rack (second rack teeth) 12b of the rack shaft 12; and a guide mechanism 40 that presses the rack shaft 12 against the pinion shaft 38.

The worm gear mechanism 36 has a worm 42 attached to a motor shaft (not shown) of the assist motor 34 and a worm wheel 44 that meshes with the worm 42. The worm wheel 44 is pivotally attached to the pinion shaft 38. The worm gear mechanism 36 functions as a deceleration mechanism, by which rotary motion transmitted from the assist motor 34 is decelerated and transmitted to the steering shaft 20.

In the torque assist mechanism 16, the assist motor 34 controlled by a not shown control device according to the torque detected by the torque sensor 30. The driving torque generated by the assist motor 34 is transmitted via the worm gear mechanism 36 and the pinion shaft 38 to the rack shaft 12 as a force that increases the steering force applied to the steering wheel 18 by the driver. Note that, in FIG. 1, the torque sensor 30 is shown as a non-contact type torque sensor (magnetostrictive torque sensor) using a magnetostrictive effect, but is not limited thereto. For example, a not shown contact type torque sensor using a slip ring method may be used as the torque sensor 30.

Figure 2:
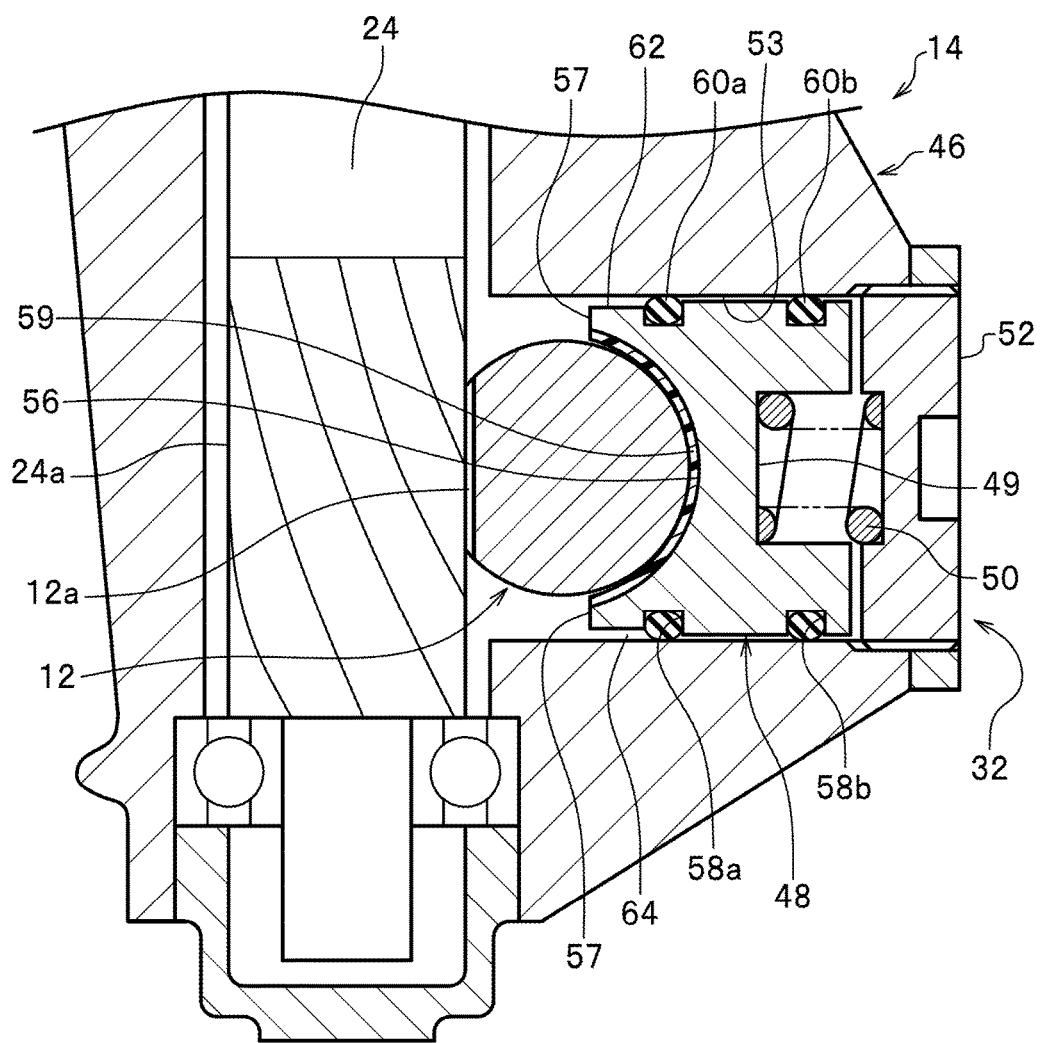
FIG. 2 is a partially cut away cross-sectional view taken along an axial direction of a pinion shaft, showing a guide mechanism of a steering mechanism.

The guide mechanism 32 of the steering mechanism 14 and the guide mechanism 40 of the torque assist mechanism 16 have substantially the same structure except the material of a rack guide member described later. FIG. 2 is a partially cut away cross-sectional view taken along an axial direction of a pinion shaft, showing a guide mechanism on the steering mechanism side.

As shown in FIG. 2, the guide mechanism 32 of the steering mechanism 14 includes a rack shaft housing 46. In the rack shaft housing 46, a first rack guide member (first pressing member) 48, a coil spring 50, and a screw member 52 are disposed.

The first rack guide member 48 is slidably disposed along a housing hole 53 formed in the rack shaft housing 46. The first rack guide member 48 has an end on which a curved surface portion 56 is disposed. The curved surface portion 56 abuts via a later-described guide pad 59 against a back surface of the rack shaft 12 to press the rack shaft 12 against the pinion shaft 24. The first rack guide member 48 is disposed across the rack shaft 12 from the pinion shaft 24 such that the rack shaft 12 is interposed between the first rack guide member 48 and the pinion shaft 24.

The coil spring 50 is housed in a recess 49 of the first rack guide member 48. A spring force of the coil spring 50 biases the first rack guide member 48 toward the pinion shaft 24. The screw member 52 is fastened to a threaded portion of the rack shaft housing 46 to hold the coil spring 50.

The guide mechanism 40 of the torque assist mechanism 16 includes a second rack guide member (second pressing member) 54 (see FIG. 4 referenced later) that abuts against a back surface of the rack shaft 12 to press the rack shaft 12 against the pinion shaft 38. The other structure of the guide mechanism 40 of the torque assist mechanism 16 is the same as the guide mechanism 32 of the steering mechanism 14. The second rack guide member 54 is disposed across the rack shaft 12 from the pinion shaft 38 such that the rack shaft 12 is interposed between the second rack guide member 54 and the pinion shaft 38.

Figure 3:
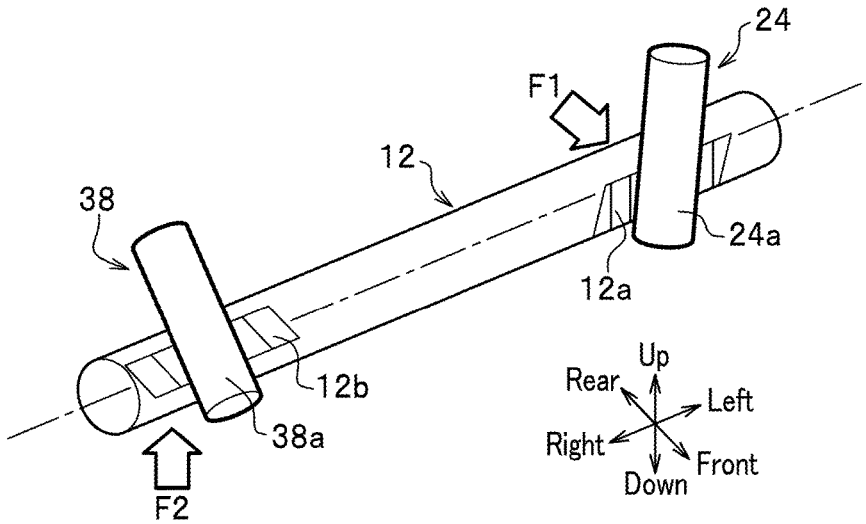
FIG. 3 is a schematic view illustrating the direction of a pressing force applied to a rack shaft by a first rack guide member of the steering mechanism and the direction of a pressing force applied to the rack shaft by a second rack guide member of a torque assist mechanism.
Figure 4A:
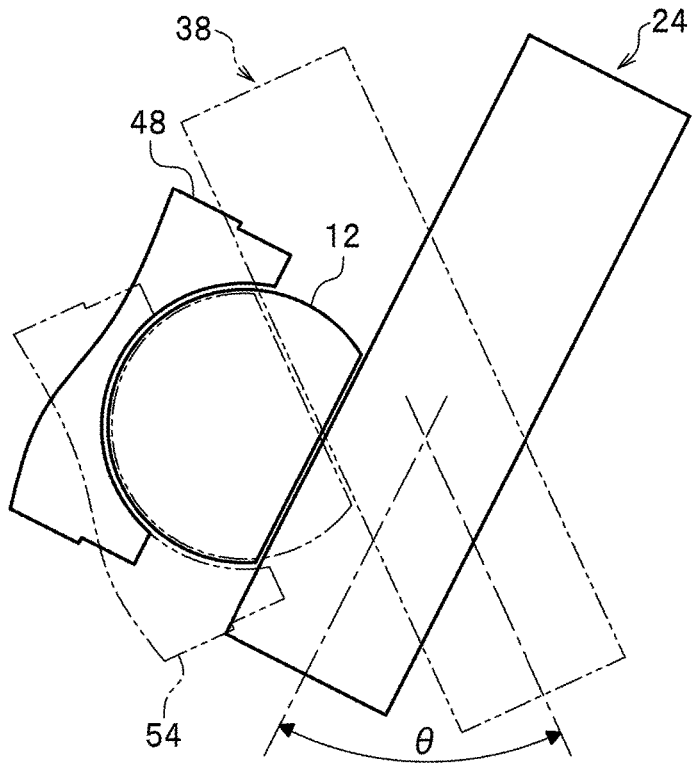
FIG. 4A is a schematic view illustrating the phase relationship between two pinion shafts with respect to a radial direction of the rack shaft.
Figure 4B:
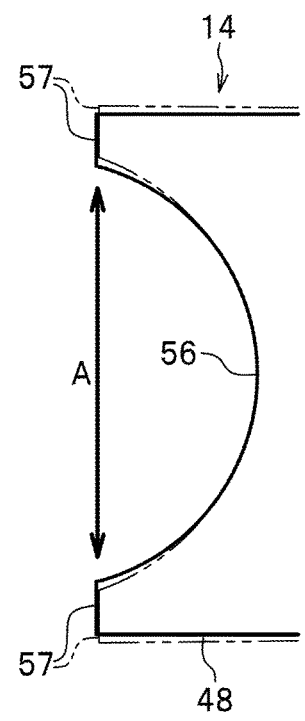
FIG. 4B is a schematic view showing a state of the first rack guide member whose bifurcated portions are deformed.

FIG. 3 is a schematic view illustrating the direction of the pressing force applied to the rack shaft by the first rack guide member of the steering mechanism and the direction of the pressing force applied to the rack shaft by the second rack guide member of the torque assist mechanism. FIG. 4A is a schematic view illustrating the phase relationship between the two pinion shafts with respect to a radial direction of the rack shaft. FIG. 4B is a schematic view showing a state of the first rack guide member whose bifurcated portions are deformed.

As shown in FIG. 3, in the steering mechanism 14 (right side in the figure), the rack shaft 12 is pressed by the first rack guide member 48 against the pinion shaft 24 in the direction of arrow F1. In other words, the rack shaft 12 is supported by the first rack guide member 48 in a vehicle front-rear direction indicated by arrow F1. In the torque assist mechanism 16 (shown on the left side of the drawing), the rack shaft 12 is pressed by the second rack guide member 54 against the pinion shaft 38 in the direction of arrow F2. In other words, the rack shaft 12 is supported by the second rack guide member 54 in an approximately up-down direction indicated by arrow F2.

As shown in FIG. 4A, the phase relationship between the two pinion shafts 24 and 38 with respect to a radial direction of the rack shaft 12 is set such that the pinion shaft 24 of the steering mechanism 14 and the pinion shaft 38 of the torque assist mechanism 16 define an angle θ therebetween about the axis of the rack shaft 12.

The first rack guide member 48 of the steering mechanism 14 is made of a material having a lower rigidity than the second rack guide member 54 of the torque assist mechanism 16. In the present embodiment, for example, the first rack guide member 48 is made of a light metal material such as aluminum or an aluminum alloy; and the second rack guide member 54 is made of an iron material such as cast iron or stainless steel.

In the present embodiment, "rigidity" means the material property of an object to be less likely to deform against an external force. Preferably, comparison of the rigidity between the first rack guide member 48 and the second rack guide member 54 is made based on the Young's modulus representing the rigidity of an object in terms of expansion or contraction of the object in the direction in which an external force is applied to the object.

Returning to FIG. 2, the first rack guide member 48 (second rack guide member 54) has bifurcated portions 57 having therebetween the curved surface portion 56 having an arc-shaped cross section. On the curved surface portion 56, there is provided a guide pad 59 having a contact surface formed to have an arc-shaped cross section corresponding to a circumferential surface of the rack shaft 12 and to be brought into contact with the rack shaft 12. Preferably, the guide pad 59 is made of a resin material having a substantially constant thickness and having durability. Examples of such a resin material include: a polyacetal resin, a resin containing polyacetal, and a fluororesin such as a polytetrafluoroethylene resin (PTFE) or Teflon®. The curved surface portion 56 abuts via the guide pad 59 against a portion of the circumferential surface of the rack shaft 12 and functions as a press surface that presses the back surface of the rack shaft 12 against the pinion shaft 24 (pinion 24a) or the pinion shaft 38 (pinion 38a).

The first rack guide member 48 (second rack guide member 54) has an circumferential surface having annular grooves 58a and 58b, in which a pair of O-rings 60a and 60b are attached. The O-ring 60a is disposed on a side of the first rack guide member 48 near the rack shaft 12 and O-ring 60b is disposed on a side of the first rack guide member 48 near the screw member 52. Note that, in the present embodiment, the pair of annular grooves 58a and 58b are spaced apart from each other by a predetermined distance in an axial direction, but are not limited thereto. For example, the pair of O-rings 60a, 60b may be attached in a single annular groove.

The first rack guide member 48 (second rack guide member 54) has a reduced diameter portion 62 on a side of the first rack guide member 48 on which the curved surface portion 56 is located. The reduced diameter portion 62 has an outside diameter surface having a smaller outside diameter than other portion of the first rack guide member 48. The reduced diameter portion 62 has a constant outside diameter continuously from an end surface of the curved surface portion 56 to the annular groove 58a. An inner wall surface of the housing hole 53 and the outside diameter surface of the reduced diameter portion 62 define a clearance 64 therebetween which is larger than that defined by the other outside diameter surface of the first rack guide member 48 and the inner wall surface of the housing hole 53. The working effect of the reduced diameter portion 62 is described later in detail.

The electric power steering device 10 is basically configured as described above. The working effect of the structure is described next.

When a driver operates the steering wheel 18, a resultant steering force is transmitted to the rack shaft 12, which causes the rack shaft 12 to move left or right along the vehicle width direction to turn the left and right wheels 28, 28. When the rack shaft 12 moves, the assist motor 34 (see FIG. 1) is driven by a control device not shown in response to the torque detected by the torque sensor 30.

When the steering force of the driver is increased by the driving force of the assist motor 34, the load applied to the rack shaft 12 by the pinion shaft 38 on the side of the torque assist mechanism 16 (assist motor 34) is greater than the load applied to the rack shaft 12 by the pinion shaft 24 of the steering mechanism 14. In other words, due to the driving force of the assist motor 34, a larger load is applied to the rack and pinion of the torque assist mechanism 16 than that applied to the rack and pinion of the steering mechanism 14. For this reason, the rack 12b and the pinion 24a, i.e., the rack and pinion of the torque assist mechanism 16, are likely to align each other.

Specifically, the rack shaft 12 slightly rotates in a radial direction so that the rack shaft 12 adapts itself to the pinion 24a of the torque assist mechanism 16. As a result, the rack 12b and the pinion 24a establish an optimum angular relationship with each other within a rotatable range of the rack shaft 12. Consequently, misalignment may possibly occur between the rack teeth and the pinion of the rack and pinion of the steering mechanism 14 and impair the feeling of smoothness in steering.

However, in the present embodiment, the first rack guide member 48 that presses the rack shaft 12 of the steering mechanism 14 is made of a material having a lower rigidity than the second rack guide member 54 that presses the rack shaft 12 on the side of the torque assist mechanism 16 (assist motor 34). Specifically, the first rack guide member 48 of the steering mechanism 14 is made of aluminum or an aluminum alloy and the second rack guide member 54 on the side of the torque assist mechanism 16 (assist motor 34) is made of cast iron capable of withstanding a large load.

Because the first rack guide member 48 of the steering mechanism 14 is made of aluminum or an aluminum alloy, which has a lower rigidity than the second rack guide member 54, the bifurcated portions 57 of the first rack guide member 48 can elastically deform outward in the direction of arrow A (see the two-dot chain line in FIG. 4B) to absorb a gap between mesh angles of the rack 12b and the pinion 24a.

As a result, the present embodiment can avoid misalignment from occurring between the rack teeth and the pinion of the rack and pinion of the steering mechanism 14, which may maintain the feeling of smoothness in steering.

In the present embodiment, the first rack guide member 48 of the steering mechanism 14 is made of aluminum or aluminum alloy, whereby misalignment that may occur in the rack and pinion of the steering mechanism 14 can be preferably absorbed. In addition, the second rack guide member 54 of the torque assist mechanism 16 may be made of a material having a higher rigidity than aluminum or an aluminum alloy, such as iron. This increases the degree of freedom of material selection.

In the present embodiment, the second rack guide member 54 of the torque assist mechanism 16 is made of an iron material. This makes it possible to configure the first rack guide member 48 to have a lower rigidity than the second rack guide member 54 with a material having a lower rigidity than iron, examples of which include metal materials such as aluminum alloys as well as resin materials having a lower rigidity than iron. With the selection of these materials, the manufacturing cost of the first rack guide member 48 can be lowered.

In the present embodiment, the first rack guide member 48 of the steering mechanism 14 and the second rack guide member 54 of the torque assist mechanism 16 are made of metal materials of different types, but not limited thereto. The materials of the first rack guide member 48 of the steering mechanism 14 and the second rack guide member 54 of the torque assist mechanism 16 may be of different types or the same type so long as the former has a lower rigidity than the latter. Note that, examples of the materials for the first and second rack guide members 48 and 54 include resin materials, fiber-reinforced resin materials, and metal materials.

The FIGS. 5A and 5B are each an explanatory view illustrating a meshing state between the rack shaft and the pinion shaft. In FIGS. 5A and 5B, illustration of the guide pad 59 is omitted. When the rack 12a of the rack shaft 12 and the pinion 24a of the pinion shaft 24 mesh with each other, the following forces are generated in the rack shaft 12: a separation force Fr that occurs when the rack 12a meshes with the pinion 24a, a force Fu that acts in an axial direction of the pinion shaft 24, and a friction Fn that acts in the direction of the meshing line of the rack shaft 12 against a load applied perpendicular to a tooth surface of the rack shaft 12. A resultant force of these forces (Fr+Fu+Fn) acts on the rack shaft 12. The rack shaft 12 is pressed in the direction of dotted arrow C so that the contact pressure of the rack shaft 12 on the first rack guide member 48 is strong at a contact point D (contact line or contact surface) located at an upper side of the first rack guide member 48. As a result, a turning moment is generated in the first rack guide member 48 so that the first rack guide member 48 rotates in the housing hole 53 of the rack shaft housing 46, in which the first rack guide member 48 is slidably held. In this event, in the annular grooves 58a and 58b formed on the circumferential surface of the first rack guide member 48, the filling factors of the O-rings 60a, 60b attached in the annular grooves 58a, 58b increase and the contact surface pressure of O-rings 60a, 60b also increases.

In the prior art, first rack guide member 48 is hindered from sliding in the axial direction. As a result, the contact surface pressure between the rack shaft 12 and the first rack guide member 48 increases and may cause poor sliding performance the rack shaft 12.

In the present embodiment, as shown in FIGS. 5A and 5B, the first rack guide member 48 includes the reduced diameter portion 62 located near the rack shaft 12 and having a smaller outside diameter than other portion delimited by the annular groove 58a formed on the circumferential surface of the first rack guide member 48. This configuration makes the first rack guide member 48 have different sliding speeds between the direction of arrow B1 and the direction of arrow B2. Hereinafter, this mechanism is described in detail.

As shown in FIG. 5A, when a force acts on the first rack guide member 48 in the direction of arrow B1 such that the first rack guide member 48 separates from the pinion shaft 24, a shear force acts on a housing contact side of the O-rings 60a, 60b in the direction of arrow E1 and on a rack guide member side of the O-rings 60a, 60b in the direction of arrow E2. In this situation, because the annular groove 58a has a circumferential side wall 66 formed contiguously with the reduced diameter portion 62 and having a smaller outside diameter (i.e., because a large clearance 64 is provided), a large relief space is provided for the O-ring 60a. As a result, the sliding resistance of the O-ring 60a can be lowered.

As shown in FIG. 5B, when a force acts on the first rack guide member 48 in the direction of arrow B2 such that the first rack guide member 48 approaches the pinion shaft 24, a shear force acts on the housing contact side of the O-rings 60a, 60b in the direction of arrow E2, and on the rack guide member side of the O-rings 60a, 60b in the direction of arrow E1. In this situation, no relief space is provided for the O-ring 60a because the annular groove 58a has another circumferential side wall 68 facing the circumferential side wall 66, being not contiguous with the reduced diameter portion 62, and having a larger outside diameter than the reduced diameter portion 62. As a result, the sliding resistance of the O-ring 60a becomes large.

By making the first rack guide member 48 have different sliding resistances between a forward motion and a backward motion of the first rack guide member 48 in the axial direction thereof (direction of arrow B1 and direction of arrow B2) as described above, an operation speed (displacement speed) of the first rack guide member 48 can be changed. With this configuration, while the separation force Fr occurs when the first rack guide member 48 meshes with the pinion shaft 24, even when a load (Fu) acting on the first rack guide member 48 in an axial direction of the pinion shaft 24 is generated, the first rack guide member 48 is able to move rapidly in a direction such that the first rack guide member 48 separates from the pinion shaft 24 (in the direction of arrow B1). As a result, the first rack guide member 48 operates smoothly on the sliding surface of the housing hole 53 of the rack shaft housing 46, and does not cause a leaning of the first rack guide member 48, thus preventing poor sliding performance of the rack shaft 12.

The first rack guide member 48 has the reduced diameter portion 62 having a smaller outside diameter than other portion.

With this configuration, even when a turning moment of the first rack guide member 48 is generated in the housing hole 53 of the rack shaft housing 46 to cause elastic deformation in the first rack guide member 48, contact between the first rack guide member 48 and the sliding surface of the housing hole 53 may be avoided. As a result, seizure of the first rack guide member 48 in the housing hole 53 may be prevented and poor sliding performance of the rack shaft 12 may be prevented.

Next, a description is given of a first rack guide member 48a and a second rack guide member 54a according to a variant embodiment. FIG. 6A is a configuration diagram of the first rack guide member according to the variant embodiment; FIG. 6B is a configuration diagram of the second rack guide member according to the variant embodiment.

In the guide mechanism 32 shown in FIG. 2, the materials of the first rack guide member 48 and the second rack guide member 54 are selected so that the first rack guide member 48 has a lower rigidity than the second rack guide member 54.

In contrast, the first rack guide member 48a and the second rack guide member 54a according to the variant embodiment differ from the first rack guide member 48 and the second rack guide member 54 in that the first rack guide member 48a and the second rack guide member 54a are configured to have different shapes for the bifurcated portions 57, 57 located near the rack shaft 12, so that the first rack guide member 48a has a lower rigidity than the second rack guide member 54a.

Specifically, as shown in FIG. 6A, the first rack guide member 48a has an outer circumferential surface on which a reduced diameter portion 62a having a smaller outside diameter than other portion of the outer circumferential surface is formed near the rack shaft 12. Moreover, the second rack guide member 54a has an outer circumferential surface having a uniform outside diameter from an end thereof near the rack shaft 12. With this configuration, the bifurcated portions 57, 57 of the first rack guide member 48a has an outside diameter dimension D1 smaller than an outside diameter dimension D2 of the bifurcated portions 57, 57 of the second rack guide member 54a (i.e., D1<D2).

As a result, the bifurcated portions 57 of the first rack guide member 48a are formed to have a thickness smaller than that of the bifurcated portions 57 of the second rack guide member 54a, so that the first rack guide member 48a has a lower rigidity than the second rack guide member 54a.

The above-described difference in rigidity of different kinds of materials and the difference in rigidity of materials having different shapes may be combined to configure the first rack guide member 48 or 48a to have a lower rigidity than the second rack guide member 54 or 54a.

In addition, the first rack guide member 48 or 48a and the second rack guide member 54 or 54a may be formed such that the largest outside diameter of the former is smaller than that of the latter so that the former has a lower rigidity than the latter.

REFERENCE SIGNS LIST

10: dual-pinion electric power steering device
12: rack shaft
12a: rack (first rack teeth)
12b: rack (second rack teeth)
14: steering mechanism
16: torque assist mechanism
18: steering wheel
24: pinion shaft (first pinion shaft)
28: left and right wheels (turnable members)
34: assist motor (rotational driving source)
38: pinion shaft (second pinion shaft)
48, 48a: first rack guide member (first pressing member)
54, 54a: second rack guide member (second pressing member)
56: curved surface portion
57: bifurcated portions

The invention claimed is:

1. A dual-pinion electric power steering device comprising:
    a rack shaft that causes a turnable member to turn;
    a first pinion shaft to which a steering force from a steering wheel is transmitted;
    a first rack teeth disposed on the rack shaft and capable of meshing with the first pinion shaft;
    a second pinion shaft to which a rotational driving force from a rotational driving source is transmitted;
    a second rack teeth disposed on the rack shaft and capable of meshing with the second pinion shaft;
    a first pressing member disposed across the rack shaft from the first pinion shaft such that the rack shaft is interposed between the first pressing member and the first pinion shaft, the first pressing member configured to press the rack shaft against the first pinion shaft; and
    a second pressing member disposed across the rack shaft from the second pinion shaft such that the rack shaft is interposed between the second pressing member and the second pinion shaft, the second pressing member configured to press the rack shaft against the second pinion shaft,
    wherein the first pressing member has a lower rigidity than the second pressing member, the first pressing member is made of a material having a lower rigidity than the second pressing member, and the first pressing member is made of aluminum or an aluminum alloy.

2. The dual-pinion electric power steering device of claim 1, wherein the second pressing member is made of an iron material.

3. The dual-pinion electric power steering device of claim 2,
    wherein each of the first pressing member and the second pressing member includes bifurcated portions having therebetween a curved surface portion having an arc-shaped cross section, and
    wherein the first pressing member and the second pressing member are configured such that the bifurcated portions of the first pressing member have a smaller outside diameter dimension than an outside diameter dimension of the bifurcated portions of the second pressing member.

4. The dual-pinion electric power steering device of claim 1,
    wherein each of the first pressing member and the second pressing member includes bifurcated portions having therebetween a curved surface portion having an arc-shaped cross section, and
    wherein the first pressing member and the second pressing member are configured such that the bifurcated portions of the first pressing member have a smaller outside diameter dimension than an outside diameter dimension of the bifurcated portions of the second pressing member.

* * * * *